United States Patent Office 3,287,372
Patented Nov. 22, 1966

3,287,372
PROCESS AND INTERMEDIATES FOR MANUFACTURE OF 2-(DIALKYLMETHYL) - 5 - ALKYL-2-CYCLOHEXEN-1-ONES
Kent C. Brannock and Herman E. Davis, Kingsport, Tenn., assignors to Eastman Kodak Company, Rochester, N.Y., a corporation of New Jersey
No Drawing. Filed July 9, 1964, Ser. No. 381,558
12 Claims. (Cl. 260—345.9)

This invention relates to a novel chemical process for manufacturing menthenone, i.e., 2-isopropyl-5-methyl-2-cyclohexen-1-one, and related compounds, to novel chemical compounds useful in the process and to the preparation of the novel compounds.

Heretofore, menthenone has been prepared from menthone. We have now discovered a novel method for preparing menthenone and related compounds from readily available chemical compounds which does not require the use of menthone.

In accordance with the process of our invention, we prepare menthenone by reacting 6-methyl-2-hepten-4-one with an alkyl vinyl ether, hydrolyze the reaction product with a dilute aqueous acid solution to 3,7-dimethyl-5-oxooctanal and dehydrate the 3,7-dimethyl-5-oxooctanal with a dilute aqueous alkaline solution to menthenone. The reaction product of 6-methyl-2-hepten-4-one and the alkyl vinyl ether is predominantly a novel 2-alkoxy-6-isobutyl - 4 - methyl - 3,4 - dihydro - 2H - pyran when cis-6-methyl-2-hepten-4-one is the major unsaturated ketone reactant and is predominantly a novel 8-alkoxy-2,6-dimethyl-7-octen-4-one when trans-6-methyl-2-hepten-4-one is the major unsaturated ketone reactant.

In the broader aspects of our invention, we prepare a novel 2-alkoxy-4-alkyl-6-(2,2-dialkylethyl)-3,4-dihydro-2H-pyran or a novel 1-alkoxy-3,7,7-trialkyl-1-hepten-5-one by contacting a 1,5,5-trialkyl-1-penten-3-one with an alkyl vinyl ether. The 2-alkoxy-4-alkyl-6-(2,2-dialkylethyl)-3,4-dihydro-2H-pyran is the predominant product of the reaction when cis-1,5,5-trialkyl-1-penten-3-one is employed as the major ketone reactant and 1-alkoxy-3,7,7-trialkyl-1-hepten-5-one is the predominant product of the reaction when trans-1,5,5-trialkyl-1-penten-3-one is employed as the major ketone reactant.

The reaction product, i.e., the 2-alkoxy-4-alkyl-6-(2,2-dialkylethyl)-3,4-dihydro-2H-pyran or the 1-alkoxy-3,7,7-trialkyl-1-hepten-5-one or a mixture of the two reactants can be hydrolyzed by contact with a dilute aqueous solution of an acid to yield a novel 3,7,7-trialkyl-5-oxoheptanal. The 3,7,7-trialkyl-5-oxoheptanal can then be cyclodehydrated by contact with a dilute aqueous solution of a base to yield a 2-(dialkylmethyl)-5-alkyl-2-cyclohexene-1-one, e.g., menthenone.

The processes of our invention can be represented by the following equations:

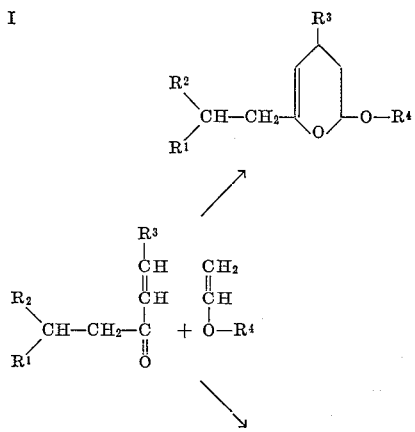

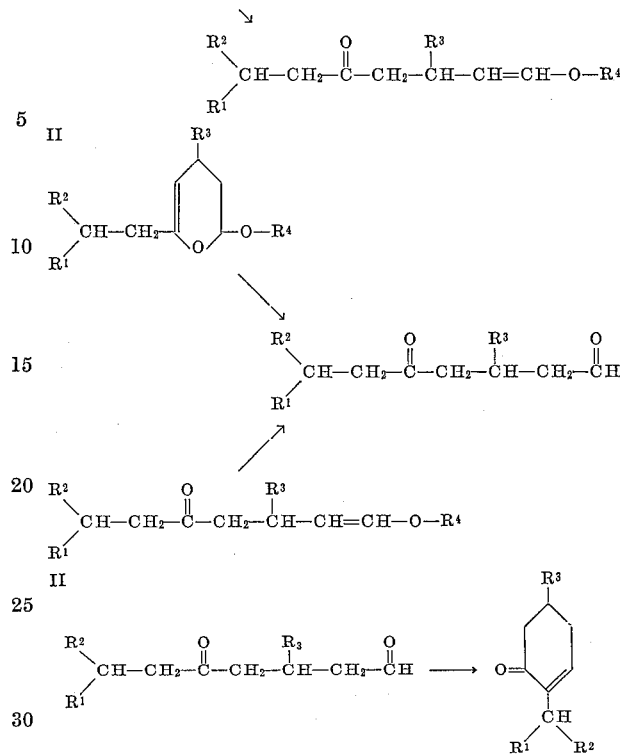

In the formulae of the preceding equations, each of the substituents $R^1$, $R^2$ and $R^3$ is lower alkyl, e.g., alkyl of 1 to about 4 carbon atoms, and $R^4$ is straight or branched-chain alkyl of 1 to 8 carbon atoms and preferably lower alkyl. When menthenone, i.e., 2-isopropyl-5-methyl-2-cyclohexen-1-one is desired as the ultimate product of our process, each of the substituents $R^1$, $R^2$ and $R^3$ in the preceding formulae must be methyl.

We prepare the novel 2-alkoxy-4-alkyl-6-(2,2-dialkylethyl)-3,4-dihydro-2H-pyrans and the novel 1-alkoxy-3,7,7-trialkyl-1-hepten-5-ones of our invention by contacting 1,5,5-trialkyl-1-penten-3-one with an alkyl vinyl ether while heating the mixture, e.g., at a temperature of about 150° C. to about 300° C. The contacting is preferably carried out in an autoclave at autogenous pressure. A preferred temperature range for practicing the process of our invention is from about 175° C. to about 275° C.

Examples of alkyl vinyl ethers that are useful in the process of our invention include methyl vinyl ether, ethyl vinyl ether, propyl vinyl ether, butyl vinyl ether, sec-butyl vinyl ether, tert-butyl vinyl ether, pentyl vinyl ether, 2-ethylhexyl vinyl ether, etc. Preferred are those vinyl ethers in which the alkyl moiety is lower alkyl, e.g., alkyl of 1 to about 4 carbon atoms.

Examples of useful 1,5,5-trialkyl-1-penten-3-ones include 6-methyl-2-hepten-4-one; 6-methyl-2-octen-4-one; 6-ethyl-2-octen-4-one; 7-methyl-3-octen-5-one; 7-methyl-3-nonen-5-one; 7-ethyl-3-nonen-5-one; etc.

A stoichiometric excess of either the alkyl vinyl ether or the 1,5,5-trialkyl-1-penten-3-one can be employed. However, we prefer to employ an excess of the alkyl vinyl ether. A small amount of hydroquinone can be added to the reaction mixture to prevent undesirable side reactions.

The 2-alkoxy-4-alkyl-6-(2,2-dialkylethyl)-3,4-dihydro-2H- pyran and the 1-alkoxy-3,7,7-trialkyl-1-hepten-5-one produced can be separated from each other by distillation. However, when these products are to be hydrolyzed to a 3,7,7-trialkyl-5-oxoheptanal, it is unnecessary to separate them.

Examples of the novel 2-alkoxy-4-alkyl-6-(2,2-dialkylethyl)-3,4-dihydro-2H-pyrans include 2-methoxy-6-isobutyl-4-methyl-3,4-dihydro-2H-pyran;
2-ethoxy-6-isobutyl-4-methyl-3,4-dihydro-2H-pyran;
2-butoxy-6-isobutyl-4-methyl-3,4-dihydro-2H-pyran;
2-(2-ethylhexoxy)-6-isobutyl-4-methyl-3,4-dihydro-2H-pyran;
2-ethoxy-6-isobutyl-4-ethyl-3,4-dihydro-2H-pyran;
2-ethoxy-6-(2-methyl-butyl)-4-methyl-3,4-dihydro-2H-pyran;
2-ethoxy-6-(2-ethylhexyl)-4-butyl-3,4-dihydro-2H-pyran;
etc.

Examples of the novel 1-alkoxy-3,7,7-trialkyl-1-hepten-5-ones of our invention include 1-methoxy-3,7-dimethyl-1-octen-5-one; 1-ethoxy-3,7-dimethyl-1-octen-5-one; 1-butoxy-3,7-dimethyl-1-octen-5-one; 1-(2-ethylhexoxy) - 3,7-dimethyl-1-octen-5-one; 1-(2-ethylhexoxy)-3,7-dimethyl-1-oten-5-one; 1-ethoxy-3,7-diethyl-1-nonen-5-one; 1-ethoxy-3,7-dipropyl-1-decen-5-one; etc.

The 3,7,7-trialkyl-5-oxo-heptanals of our invention are prepared by hydrolyzing a 2-alkoxy-4-alkyl-6-(2,2-dialkylethyl)-3,4-dihydro-2H-pyran, a 1-alkoxy-3,7,7-trialkyl-1-hepten-5-one or a mixture of these compounds. The hydrolysis is carried out by contacting the compound or a mixture of the compounds with a dilute aqueous solution of an acid. Preferred acids are mineral acids such as phosphoric acid, sulfuric acid, hydrochloric acid, etc. Other useful acids include organic acids such as oxalic acid, acetic acid, chloroacetic acid, etc. The hydrolysis can be carried out at any temperature at which the aqueous acid solution is liquid, i.e., any temperature from the freezing point to the boiling point of the solution. The 3,7,7-trialkyl-5-oxoheptanal can be separated from the remainder of the reaction mixture by decantation and purified by distillation.

Examples of the novel 3,7,7-trialkyl-5-oxoheptanals of our invention include 3,7-dimethyl-5-oxooctanal; 3,7-diethyl-5-oxononanal; 3,7-dimethyl-5-oxononanal; 3-ethyl-7-methyl-5-oxononanal; 3 - ethyl-7-methyl-5-oxooctanal; etc.

The 2-(dialkylmethyl)-5-alkyl-2-cyclohexen-1-ones are prepared by contacting a 3,7,7-trialkyl-5-oxoheptanal with a dilute aqueous solution of a base. The contacting of the 3,7,7-trialkyl-5-oxoheptanal with the basic solution can be carried out at any temperature at which the solution is liquid, i.e., at any temperature from the freezing point of the solution to the boiling point of the solution. The contacting is preferably carried out at a temperature in excess of 50° C. A water soluble organic solvent, e.g., ethyl alcohol, isopropyl alcohol, etc. is preferably added to the reaction mixture to speed up the rate of formation of the 2-(dialkylmethyl)-5-alkyl-2-cyclohexen-1-one.

The following examples illustrate the process and some of the novel compounds of our invention.

*Example 1*

A mixture of cis-6-methyl-2-hepten-4-one (63 g., 0.5 mole), ethyl vinyl ether (72 g., 1 mole) and hydroquinone (0.1 g.) was heated in an autoclave at 225° C. for 5 hr. After removing the excess ethyl vinyl ether the product was distilled, B.P. 84° C./8 mm. $n_D^{20}$ 1.4410. (Yield: 76 g., 77%.) Analytical, infrared and nuclear magnetic resonance data indicated that the compound was 2-ethoxy-3,4-dihydro-6-isobutyl-4-methyl-2H-pyran.

*Example 2*

A mixture of cis-6-methyl-2-hepten-4-one (76 g., 0.6 mole), ethyl vinyl ether (72 g., 1 mole), and hydroquinone (0.1 g.) was heated in an autoclave at 175° C. for 5 hr. It was processed as described in Example 1 to give 21 g. of 2-ethoxy-3,4-dihydro-6-isobutyl-4-methyl-2H-pyran.

*Example 3*

The procedure of Example 1 was repeated except that the autoclave was at 200° C. for 5 hr. After processing, 49 g. of 2-ethoxy-3,4-dihydro-6-isobutyl-4-methyl-2H-pyran was obtained.

*Example 4*

A repeat of Example 1 in which methyl vinyl ether (58.0 g., 1 mole) was used in place of ethyl vinyl ether gave a 76% yield of 2-methoxy-3,4-dihydro-6-isobutyl-4-methyl-2H-pyran.

*Example 5*

A repeat of Example 1 in which butyl vinyl ether (100.2 g., 1 mole) was substituted for ethyl vinyl ether gave 70% of the corresponding 2-butoxy-3,4-dihydro-6-isobutyl-4-methyl-2H-pyran.

*Example 6*

A repeat of Example 1 in which 2-ethylhexyl vinyl ether (156.3 g., 1 mole) was substituted for ethyl vinyl ether gave 50% of the corresponding pyran compound.

*Example 7*

Ethyl vinyl ether (576 g., 8 moles), trans-6-methyl-2-hepten-4-one, and hydroquinone (1 g.) were heated in an autoclave at 250° C. for 5 hr. After removing the excess ethyl vinyl ether, the product was distilled to give 703 g. (88.5%) of a mixture of 8-ethoxy-2,6-dimethyl-7-octen-4-one and 2-ethoxy-3,4-dihydro-6-isobutyl-4-methyl 2H-pyran. By vapor phase chromatography the mixture was about 60–65% of the 8-ethoxy-2,6-dimethyl-7-octen-4-one. On redistillation, 278 g. of good 8-ethoxy-2,6-dimethyl-7-octen-4-one, B.P. 102–103° C./5 mm., $n_D^{20}$ 1.4429, was obtained.

*Example 8*

Ethyl vinyl ether (576 g., 8 moles), a mixture of cis (65%) and trans (35%) 6-methyl-2-hepten-4-one, and hydroquinone (1 g.) are heated in an autoclave at 250° C. for 5 hr. After removing the excess ethyl vinyl ether, the product is distilled to give 676 g. (85%) of a mixture of 2-ethoxy-3,4-dihydro-6-isobutyl-4-methyl-2H-pyran and 8-ethoxy-2,6-dimethyl-7-octen-4-one. By vapor phase chromatography, it is approximately 70% of the 2-ethoxy-3,4-dihydro-6-isobutyl-4-methyl-2H-pyran and 30% of the 8-ethoxy-2,6-dimethyl-7-octen-4-one.

*Example 9*

The 2-ethoxy-3,4-dihydro-6-isobutyl-4-methyl-2H-pyran (79 g., 0.4 mole) of Example 1 was stirred and refluxed with 400 ml. of aqueous 1% phosphoric acid while removing ethanol by distillation. When no further ethanol distilled, the organic layer was washed with water until neutral and distilled. B.P. 69–71° C./0.5 mm. Yield: 58 g. M.P. of the mono-2-,4-dinitrophenylhydrazone derivative, 82° C.

*Analysis.*—Calcd.: 70.60; H, 10.67. Found: C, 70.45; H, 10.58. Infrared and nuclear magnetic resonance data were compatible with the structure 3,7-dimethyl-5-oxooctanal.

*Example 10*

2 - ethoxy - 3,4 - dihydro - 6 - isobutyl - 4 - methyl - 2H-pyran (125 g.) was dissolved in ethanol (250 ml.) and the solution stirrred with 500 ml. of aqueous 15% hydrochloric acid at 25° C. for 16 hrs. The product layered out as a lighter than water oil. It was separated, washed with water until neutral, and distilled. Analytical data indicated that the compound was 3,7-dimethyl-5-oxooctanal.

*Example 11*

A sample of 8-ethoxy-2,6-dimethyl-7-octen-4-one (40 g., 0.2 mole) and dilute aqueous 1% phosphoric acid were stirred and heated at reflux for 3 hrs. while removing ethanol by distillation. When no further ethanol distilled, the organic layer was separated and washed with water until neutral. After drying, there remained 26 g. (77%) of 3,7-dimethyl-5-oxooctanal. By infrared and vapor phase chromatography, it was identical with that obtained from 2-ethoxy-3,4-dihydro-6-isobutyl-4-methyl-2H-pyran.

*Example 12*

The 3,7-dimethyl-5-oxooctanal (58 g., 0.34 mole) of Example 9 was stirred with 400 ml. of aqueous 1% sodium hydroxide and 100 ml. of isopropyl alcohol at 80–85° C. until all of the 3,7-dimethyl-5-oxooctanal had disappeared (2 hrs.). The reaction was followed by gas liquid chromatography. The organic layer was washed with water until neutral and distilled. B.P. 81–82° C./8 mm. Yield 42 g. $n_D^{20}$ 1.4682. M.P. semicarbazone derivative 155–157° C., M.P. 2,4-dinitrophenylhydrazone derivative 144–145° C. Infrared and analytical data were compatible with the structure of menthenone (2-isopropyl-5-methyl-2-cyclohexen-1-one).

*Example 13*

A mixture of 6-methyl-2-hepten-4-one (333 g., 2.64 moles), ethyl vinyl ether (381 g., 5.28 moles) and hydroquinone (0.1 g.) were heated in an autoclave at 225° C. for 5 hrs. The excess ethyl vinyl ether was removed leaving a crude mixture of 2-ethoxy-3,4-dihydro-6-isobutyl-4-methyl-2H-pyran and 8-ethoxy-2,6-dimethyl-7-octen-4-one. A solution of 1000 ml. of aqueous 1% phosphoric acid was added to the crude product. The mixture was stirred and heated as described in Example 9 until no more ethanol distilled. The organic layer was separated and added to 1000 ml. of aqueous 1% sodium hydroxide. This mixture was stirred and heated as described in Example 12 until the reaction was complete (three hours). After the organic layer was washed with water until neutral, the menthenone was distilled. Yield: 214 g. Analytical data agreed with that for Example 12.

Menthenone, prepared by the process of our invention, is valuable for the preparation of menthone which is a useful intermediate in the manufacture of menthol. Menthone can be prepared by hydrogenating menthenone in the presence of a hydrogenation catalyst, e.g., Raney nickel, and then rectifying the hydrogenation product in the presence of a dehydrogenation catalyst and an enolization catalyst as shown by Barney et al., Ind. and Engr. Chem. 36, 85–87 (January 1944).

The invention has been described in considerable detail wtih particular reference to certain preferred embodiments thereof, but it will be understood that variations and modifications can be effected within the spirit and scope of our invention as described hereinbefore and as defined in the appended claims.

We claim:
1. The process for preparing menthenone which comprises contacting 3,7-dimethyl-5-oxooctanal with a dilute aqueous solution of a base.
2. 2-ethoxy-3,4-dihydro-6-isobutyl-4-methyl-2H-pyran.
3. 1-ethoxy-3,7-dimethyl-1-octen-5-one.
4. 3,7-dimethyl-5-oxooctanal.
5. The process which comprises:

(I) preparing a compound of the formula

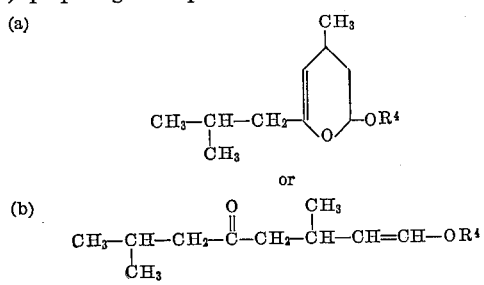

by heating 6-methyl-2-hepten-4-one with an alkoxy vinyl ether of the formula $$CH_2=CH-OR^4$$

in which $R^4$ is alkyl of 1 to 4 carbon atoms;

(II) preparing 3,7-dimethyl-5-oxooctanal by contacting the compound prepared in Step (I) with a dilute aqueous solution of an acid; and (III) contacting the 3,7-dimethyl-5-oxooctanal with a dilute aqueous solution of a base and obtaining menthenone.

6. The process of claim 5 in which $R^4$ is ethyl.
7. The process which comprises heating trans-6-methyl-2-hepten-4-one with an alkyl vinyl ether of the formula $$CH_2=CH-OR^4$$

at a temperature of about 150° C. to about 300° C. and obtaining an 1-alkoxy-3,7-dimethyl-1-octen-5-one of the formula

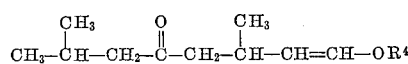

in which $R^4$ is alkyl of 1 to 4 carbons.

8. The process of claim 7 in which R is ethyl.
9. The process which comprises contacting a compound of the formula

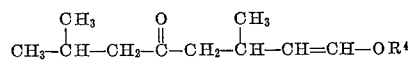

in which $R^4$ is alkyl of 1 to 4 carbon atoms with a dilute aqueous solution of an acid and obtaining 3,7-dimethyl-5-oxooctanal.

10. The process of claim 9 in which $R^4$ is ethyl.
11. A compound of the formula

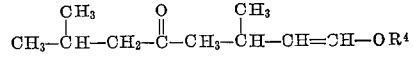

in which $R^4$ is alkyl of 1 to 4 carbons.

12. A compound of the formula

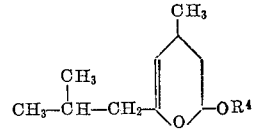

in which $R^4$ is alkyl of 1 to 4 carbons.

References Cited by the Examiner

UNITED STATES PATENTS 2,387,587  10/1945  Hunsdiecker ........ 260—586
2,624,764  1/1953   Emerson et al. ___ 260—345.9 X

OTHER REFERENCES

Royals, E.: Advanced Organic Chemistry (1956), pp. 750–753; 764–5.

Theilheimer, W.: Synthetic Methods of Organic Chemistry, vol. 6, page 315 (843) (1952); vol. 16, pp. 871, 937 (1962).

WALTER A. MODANCE, *Primary Examiner.*

N. S. MILESTONE, *Assistant Examiner.*